United States Patent Office 3,036,447
Patented May 29, 1962

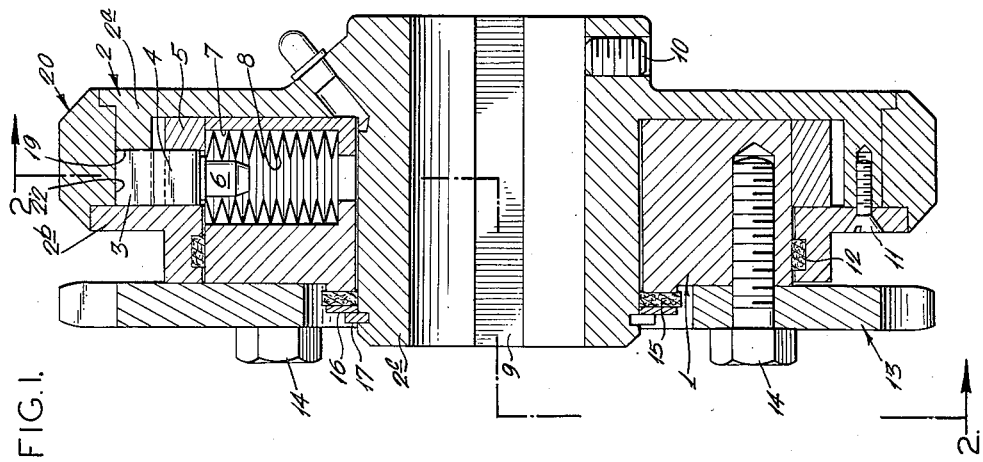

3,036,447
ADJUSTABLE TORQUE RELEASE COUPLING
Gunnar Wilhelmsson, Nyskog, Smalands Taberg, and Krister Larsson, Jonkoping, Sweden, assignors to Aktiebolaget Svenska Flaktfabriken, Nacka, Sweden
Filed June 22, 1960, Ser. No. 37,894
Claims priority, application Sweden June 26, 1959
4 Claims. (Cl. 64—29)

The present invention relates to an adjustable torque release coupling for disengaging a driven shaft at occurring overloads, consisting of a driving and a driven member, said member being adapted to be rotated by means of a number of actuating elements.

In apparatus of different kinds for the transport of material, mills, sluicing wheels and similar apparatus where a varying supply of the material may cause overloads, or foreign bodies may stop the operation of same, so-called torque release or safeguard couplings are often used to prevent breakdowns or overloadings of the driving motor. In a torque release coupling of known type being used for such cases the actuating elements consist of a number of bearing rolls being rotatably mounted within radial bores evenly distributed along the periphery of the driving member which rolls are arranged radially displaceable and are urged in an outer operating position by means of compression springs disposed in said bores under said bearing rolls which in said operating position are bearing against the inner surface of a flange being an integral part of said driven member and enclosing said driving member and which bearing rolls when the driving member is rotated are caused to actuate a corresponding number of bearing rolls being rotatably mounted but radially fixed in said flange. The transferable torque in such couplings has a constant value depending upon the springs urging said actuating elements. In practical use there is often a need for changing the torque release point without any exchange of the coupling or its elements. The invention—the object of which is to make such an adjustment possible by simple means—is characterized in that the flange of said driven member is provided with bores for said actuated bearing rolls which extend through said flange and that said actuated bearing rolls being pressed against an annular ring rotatably mounted on said flange and lockable to same, said annular ring being provided with cut grooves corresponding in number to that of said rolls and having a successively increasing depth whereby the position of the actuated rolls in radial direction can be adjusted by rotating said ring and the torque of the coupling be varied from a pre-determined maximum value to nought.

The invention will now be described more in detail with reference to the accompanying drawing showing an exemplifying embodiment of the invention wherein FIG. 1 shows a cross-section through the invented coupling, and FIG. 2 shows said coupling along the line 2—2 of FIG. 1.

In the drawing 1 designates an annular drive or driving member and a driven member. The latter is provided with a key groove 9 and a stop screw 10 for mounting same on a shaft (not shown) to be driven by means of said coupling. The driving member 1 is in the case shown rotatably journalled on the extended hub 2c of said driven member 2 and is by means of a number of screws 14 connected to a sprocket wheel 13. The actuating elements of the driving member consist of a number of bearing rolls 4 disposed within radial openings 7 evenly distributed along the periphery of said member. Each actuating roll rests on a stud 6 supported by a number of spring washers 8 by means of which the roll 4 is urged outwards to bear against a flange 2a being an integral part of said driven member which flange encloses the driving member. 5 designates a roll retaining ring arranged around the member 1 and fixed to same by means of a pin 18. In the flange 2a of the driven member there are disposed means 3 of the same number as that of the actuating elements 4 and likewise consisting of bearing rolls rotatably disposed in said flange. To make the mounting of said means 3 possible the member 2 is provided with a detachable covering disk 2b fastened by means of screws 11. 12 and 15 designate two packing glands disposed between the two members being movable relative to each other, the last of said packing glands being kept in proper position by means of a washer 16 and a locking ring 17.

According to the invention the flange 2a of said driven member is provided with bores 19 for said actuated bearing rolls which bores extend through said flange. The flange 2a is, furthermore, provided with a surrounding annular ring 20 rotatably mounted on said flange against which ring said actuated rolls are bearing. The ring 20 can by means of a screw 21 be locked with respect to said flange. The rotatable ring 20 is further provided with grooves 22 in a number corresponding to that of the rolls providing seats for the bearing rolls 3. The grooves have a successively increasing depth whereby the position of the actuated rolls in radial direction can be adjusted by rotating said ring and the torque of the coupling be varied from a pre-determined maximum value to nought.

The invention is not limited to the embodiment shown in the drawing and the two members may, for instance, be constructed to be mounted on separate shafts and the design may also within the scope of the invention be varied in other ways.

What we claim is:
1. An adjustable torque release coupling comprising concentrically disposed annular drive and driven members, a first bearing roll mounted on one of said members projecting in one radial direction therefrom toward the other member, a second bearing roll mounted on said other member adapted to engage said first roll, biasing means urging said second roll in a radial direction opposite said one direction toward and into pressure-applying engagement with said first roll to establish a releasable drive connection between said members, and means mounting said first roll for movement in a radial direction to vary selectively the position of said first roll relative to said second roll and thereby vary selectively the torque of said coupling.

2. An adjustable torque release coupling comprising, concentrically disposed annular drive and driven members, means defining a seat in one of said members, a first bearing roll mounted in said seat projecting from said one member toward the other member, a second bearing roll mounted on said other member adapted to engage said first roll, biasing means urging said second roll toward and into pressure-applying engagement with said first roll to establish a releasable drive connection between said members, and means for varying selectively the depth of said seat whereby the position of said first roll may be varied selectively relative to said second roll to thereby vary selectively the torque of said coupling.

3. An adjustable torque release coupling comprising, an annular drive member, a driven member disposed concentrically of said drive member and having a flange confronting the peripheral surface of said drive member, means defining at least one radial bore in said flange, a first bearing roll mounted in said bore projecting in one radial direction from said flange toward the peripheral surface of said driven member, means defining at least one radially extending opening in said drive member, a second bearing roll mounted in said opening adapted to engage said first roll, biasing means in said opening urging said second roll in a radial direction opposite said one direction and into pressure-applying engagement with said first roll to establish a releasable drive connection between said members, and means for moving said first roll axially of said bore to vary selectively the radial position of said first roll relative to said second roll to thereby vary selectively the torque of said coupling.

4. An adjustable torque release coupling comprising, coaxially arranged an annular drive member and a driven member having a flange confronting the outer peripheral surface of said drive member, means defining a plurality of circumferentially spaced radial bores extending through the flange of said driven member, a first bearing roll mounted in each of said bores, means defining a plurality of circumferentially spaced radially extending openings in said drive member corresponding in number to the number of said bores, a second bearing roll mounted in each of said openings, each of said second rolls adapted to engage one of said first rolls, biasing means in each of said openings for urging each said second roll into pressure-applying engagement with one of said first rolls to establish a releasable drive connection between said members, an annular ring circumscribing said flange, means defining a plurality of circumferentially spaced grooves on the inner peripheral surface of said ring, each of said grooves providing a seat for said first rolls and being of an increasing depth whereby rotation of said ring relative to said flange varies the radial position of each of said first rolls relative to said second rolls to thereby vary selectively the torque of said coupling.

References Cited in the file of this patent

UNITED STATES PATENTS

| | | |
|---|---|---|
| 1,111,990 | Braun | Sept. 29, 1914 |
| 1,496,577 | Klausmeyer | June 3, 1924 |
| 2,164,870 | Salardi | July 4, 1939 |
| 2,238,583 | Dodge | Apr. 15, 1941 |
| 2,342,540 | Hale | Feb. 22, 1944 |